United States Patent [19]

Sperlich

[11] 4,394,100
[45] Jul. 19, 1983

[54] PICKUP TRUCK CARGO BOX COVER ASSEMBLY

[75] Inventor: Harold K. Sperlich, Orchard Lake, Mich.

[73] Assignee: Chrysler Corporation, Highland Park, Mich.

[21] Appl. No.: 307,709

[22] Filed: Oct. 2, 1981

[51] Int. Cl.³ .............................................. B62D 25/20
[52] U.S. Cl. ........................................ 410/2; 296/183; 410/156
[58] Field of Search ................... 296/24 R, 39 R, 183, 296/1 F, 25, 191, 37.1, 37.6, 100; 105/373, 375; 410/2, 89, 121, 129, 156

[56] References Cited

U.S. PATENT DOCUMENTS

| | | | |
|---|---|---|---|
| Re. 27,034 | 1/1971 | Bezlaj | 296/24 R |
| 2,540,207 | 2/1951 | Mangels | 410/89 |
| 4,215,898 | 8/1980 | Ulics | 296/183 |
| 4,341,412 | 7/1982 | Wayne | 296/39 R |

Primary Examiner—David M. Mitchell
Assistant Examiner—Ross Weaver
Attorney, Agent, or Firm—Newtson & Dundas

[57] ABSTRACT

A removable cover for a pickup truck cargo box employing a standard 4×8 foot sheet of plywood to provide a second load level and a subjacent covered security area. A horizontally disposed channel is provided in the box front wall and stepped support surfaces are formed on the wheel housings. The tailgate has a horizontally disposed channel in its inner panel located in opposed relation with the front wall channel. The channels and wheel housing surfaces are sized to receive a standard rectangular building panel positioned with its forward edge in the front wall channel supported on the wheel housing surfaces in a horizontal plane. The panel's length results in its rearward edge being received and held in the tailgate channel upon the tailgate being pivoted to its upright closed position.

6 Claims, 5 Drawing Figures

U.S. Patent    Jul. 19, 1983    4,394,100
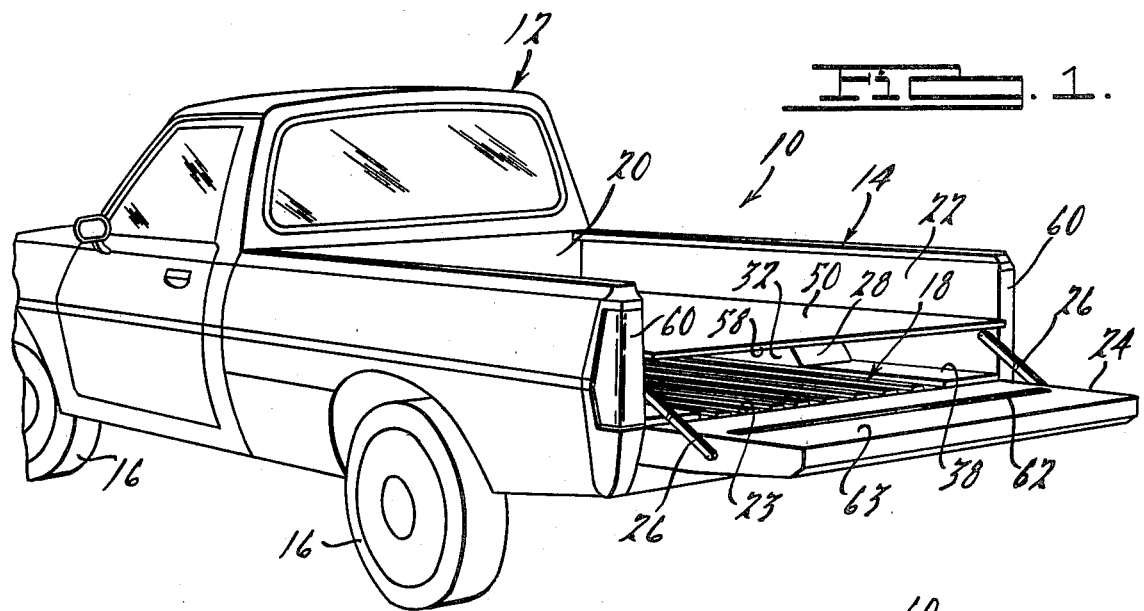
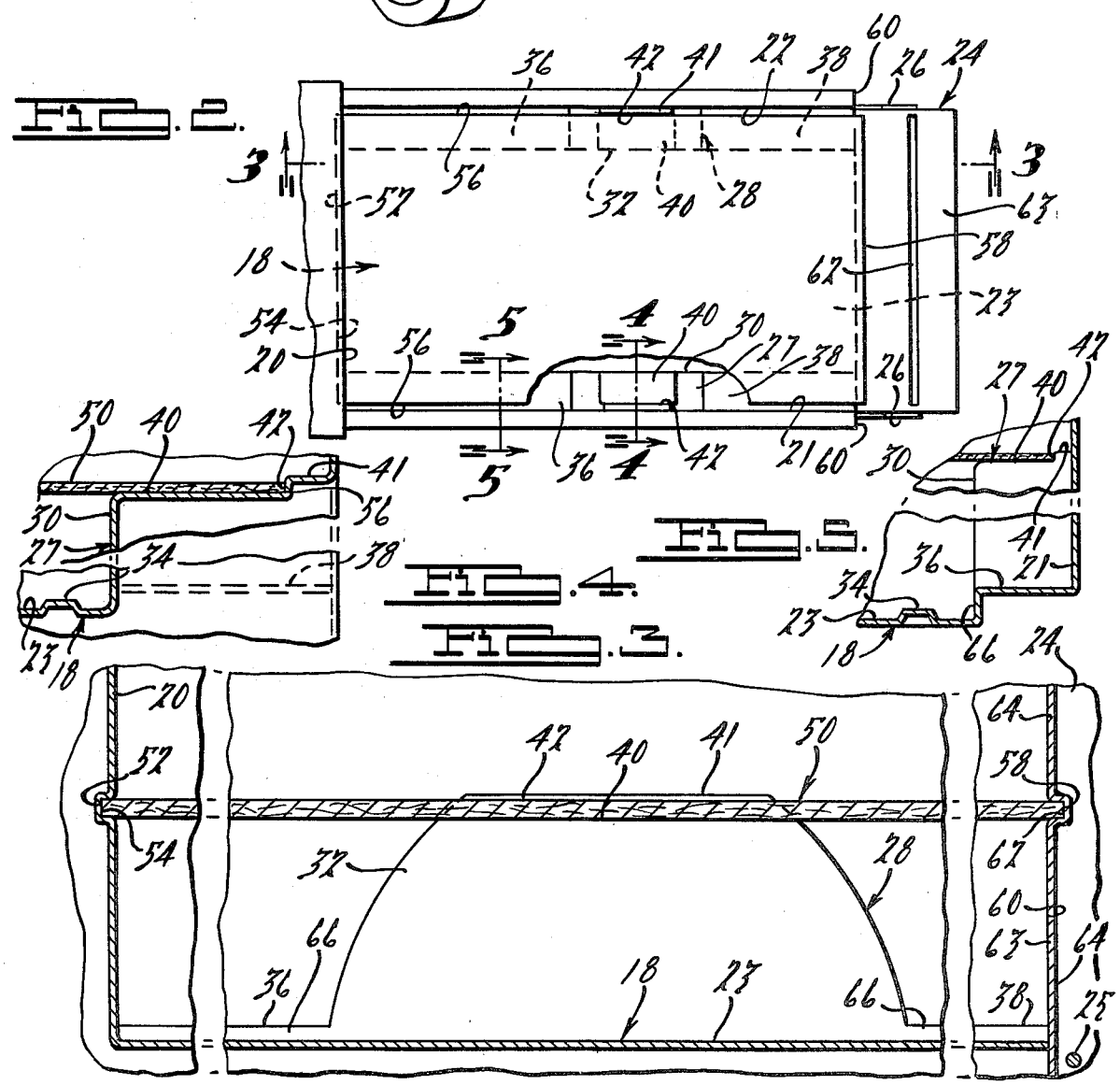

PICKUP TRUCK CARGO BOX COVER ASSEMBLY

BACKGROUND OF THE INVENTION

The present invention relates to an improved cover construction for a pickup truck storage compartment.

It is known in the prior art to provide pickup truck bed covers to prevent theft of cargo stored therein. The U.S. Pat. No. 4,252,362 issued to John T. Campbell discloses a pickup truck cargo box having pairs of opposed rails for receiving a rollable or otherwise storable fabric or slated canopy that is drawn-out of a stored condition. The canopy is designed to cover all or a portion of the cargo box to increase the utility of the vehicle and at the same time the security of its cargo.

The prior art has also attempted to provide additional load carrying capacity for pickup trucks having smaller cargo box areas. The U.S. Pat. No. 4,215,898 issued to Ulics discloses a pickup truck cargo box capable of transporting standard 4×8 foot construction panels in a flat mode even though the spacing between the wheel housings protruding into the cargo area is less than the width of the panels.

BRIEF DESCRIPTION OF THE INVENTION

The present invention relates to an improved pickup truck cargobox construction wherein its front wall and tailgate are provided with opposed coplanar channels adapted to receive the front and rear transverse edges respectively, of a rectangular building panel. The wheel housings have stepped upper surfaces sized to retain the longitudinal edges of the panel therebetween. With the tailgate closed and locked the panel is captured by the channels defining a covered lower secured area and an overlying load area.

It is therefore an object of the present invention to provide an improved pickup truck cargo box construction such that a readily removable standard size building panel is operative to cover and secure the cargo floor load area beneath the panel, while providing an additional or second level panel supporting load area.

BRIEF DESCRIPTION OF THE DRAWINGS

This and other features of the present invention will be more apparent from the following description and drawings in which:

FIG. 1 is a perspective view of a pickup truck equipped with a cargo box building panel cover shown in place providing a covered floor area beneath the panel;

FIG. 2 is a fragmentary top plan view of the cargo box with portions broken away to show details of the arrangement;

FIG. 3 is a fragmentary vertical section taken along line 3—3 of FIG. 2;

FIG. 4 is a fragmentary vertical section taken along line 4—4 of FIG. 2, and

FIG. 5 is a fragmentary vertical section taken along line 5—5 of FIG. 2.

DETAILED DESCRIPTION

Referring now to FIG. 1 a pickup truck is generally indicated at 10 having a cab portion 12 and a truck bed or cargo box portion 14 supported on wheels 16. The cargo box 14 includes a bottom wall or floor 18, a front wall 20 and opposed sidewalls 21 and 22. A tailgate 24 is mounted upon body hinge pins 25 (FIG. 3) for swinging movement about a horizontal axis between an open position shown in FIGS. 1 and 2 and its closed upright position of FIG. 3. The tailgate 24 may be further supported by toggle link check arm bars 26. The tailgate is provided with suitable locking means (not shown) such as the tailgate latching construction shown in U.S. Pat. No. 3,459,299 assigned to the same assignee the disclosure of which is incorporated by reference herein.

A pair of opposed wheel wells or housings 27 and 28 extend upwardly from the floor 18 and abut or are integral with the sidewalls 21 and 22, respectively. The cargo box bottom wall central portion 23 between the wheel well inboard faces 30 and 32 has conventional elongated ribs 34. As best seen in FIGS. 4 and 5 the floor ribs 34 extend laterally between the wheel well inboard faces 30 and 32. It will be noted that the central floor portion 23 is at a lower elevation than right and lefthand floor portions 36 forward of their respective wheel wells. While the floor portions 36 and 38 are shown planar it will be understood that they could be ribbed in the manner of the central floor portion 23. The reason the marginal floor portions 36 and 38 are at a higher level than the central floor portion 23 will be explained below.

FIGS. 4 and 5 also show each wheel well having its upper faces formed with mirror image stepped surfaces defining substantially planar inboard and outboard tread portions 40 and 41 and riser portions 42. It will be observed that in the preferred embodiment the transverse dimension between the opposed riser portions 42 is a predetermined distance sized to accommodate the width of a cover panel such as a standard 4×8 foot plywood building panel, for example.

FIG. 3 shows panel means in the form of a panel 50 having a predetermined width and thickness such that its one forward or front transverse edge 52 is readily received within cargo box front wall channel means 54. In the preferred embodiment channel 54 is formed integral with the cargo box front wall 20 and extends transversely a predetermined minimal distance substantially equal to but greater than the lateral transverse spacing between the opposed wheel housing risers 42. Thus, for example a panel, such as a plywood panel having a nominal one inch thickness and a four foot width, is designed to be easily received in channel 54 when the panel side edges 56 are in juxtaposed aligned relation with their associated left and righthand wheel housing riser portions 42.

The panel 50 has a predetermined length, preferably eight feet, such that with its front edge 52 received in channel 54 its rearward edge 58 extends a known distance beyond the rearward surfaces 60 of the cargo box sidewalls 21 and 22. The tailgate 24 has transversely extending channel means thereon adapted to receive the panel rear edge 58 therein upon the tailgate being raised to its upright closed position indicated in FIG. 3. In the preferred embodiment tailgate channel means 62 is shown formed in the inner face 63 of tailgate panel 64 in opposed coplanar relation to the front wall channel 54.

The channels 54 and 62 and the tread portions 40 are at a predetermined height above the cargo box floor 18 locating the panel 50 in a horizontal plane to define a cargo box storage area beneah the panel 50. This allows the cargo stored on the central floor portion 23 subjacent the panel 50 to be concealed from view with the tailgate closed and latched. An example of a tailgate latching mechanism for pickup trucks is disclosed in U.S. patent application Ser. No. 247,494 filed Mar. 25, 1981 now U.S. Pat. No. 4,358,150 assigned to the same assignee as the present application, the disclosure of which is incorporated by reference herein.

It will be appreciated that because the step-like floor portions 36 and 38 are offset upwardly from the elevation of the central floor portion 23 cargo carried thereon such as tool boxes, power tools, etc. will be retained against sliding movement from the floor portion 23 by opposed cargo restraining shoulders 66. Further such cargo may be secured against unauthorized removal upon the tailgate being latched and locked. Thus, it is contemplated that suitable key operated locking means may be provided for retaining the tailgate in its upright closed position. This insures that cargo carried on the floor portion 23 may be removed only upon lowering the tailgate 24 to its FIG. 1 position causing the panel rearward edge 58 to be released from its locking channel 62. Such tailgate locking means could be, for example, a key operated locking cylinder incorporated in the latch mechanism as disclosed in U.S. Pat. No. 4,158,844 to Sarosy et al, for example; or a padlock with hasp-type locking hardware disclosed in U.S. Pat. No. 4,201,411 to Morgan, for example.

Although an embodiment of the subject cover assembly for a pickup truck has been illustrated and described in detail, various modifications may be made to this specific construction thereof without falling outside the scope of the following claims which define the invention.

The invention thus contemplates that the channel means 54 and 62 could be separate channel members secured to the front wall 20 and tailgate inner face 63. With such a construction the overall dimenison between the front wall 20 and tailgate inner face 63 preferably would be at least 8 feet to accommodate standard building panels in a flat mode. Another arrangement would involve a recessed portion of the front wall 20 above the channel 54 to provide the desired minimum 8 foot overall longitudinal dimension.

Still another arrangement contemplated by the invention would provide panel means in the form of a pair of panels joined by a transverse hinge joint supported on the wheel housing surface 40. Such a construction would enable each panel section to extend longitudinally a distance more than four feet such that composite hinged panels could be designed with an overall length to accommodate pickup truck cargo areas of various lengths. A transverse hinge joint could be locked in its planar mode by slide bolts on its underside to prevent unauthorized removal of the panel while allowing for ready storage of the composite panel when not in use.

What is claimed is:

1. In combination with a pickup truck having an open cargo box formed of an upstanding front wall, upstanding sidewalls, a floor and a pivotally mounted rear tailgate defining a cargo area with a rearward access opening, said sidewalls including an opposed pair of wheel housings projecting upwardly from the floor and projecting inwardly into the cargo area, said tailgate hinged for pivotal movement about a horizontal axis between a substantially upright locked position closing at least a portion of the access opening and a lowered position; the improvement comprising:

first horizontally disposed channel means on said front wall extending a predetermined distance thereacross;

second horizontally disposed channel means on said tailgate in opposed relation with said first channel means whereby said channels define a horizontally extending plane spaced a predetermined distance above said cargo area floor;

each said wheel housing having an upper substantially planar surface located substantially in said horizontally extending plane;

rectangular panel means dimensioned such that its one forward marginal transverse edge is adapted to be snugly received in said first channel means, and said panel means having a predetermined longitudinal dimension such that with said forward edge snugly received in said front wall channel means its other rearward transverse edge is adapted to be snugly received in said tailgate channel means with said tailgate in its upright closed position whereby said panel means is retained by said tailgate channel means providing a covered load space on the cargo area floor subjacent an upper level cargo area on said panel means.

2. The cargo box as defined in claim 1 wherein, each said wheel housing upper surface is formed as a mirror image defining a stepped surface having horizontally disposed tread portions and vertically disposed laterally opposed riser portions, spaced a transverse dimension such that the panel means longitudinal edges are adapted to be in juxtaposed relation with its associated wheel housing riser portion.

3. The cargo box as defined in claim 1 wherein, said floor comprises a central floor load space portion intermediate said wheel housings and step-like marginal side portions located at a higher level defining longitudinally extending restraining shoulders adapted for contact with cargo stored on said central floor portion to maintain cargo within the confines of said central floor load space.

4. The cargo box as defined in claim 1 wherein, with said tailgate raised in its upright closed and locked position cargo stored on said central floor portion subjacent said panels means will be substantially secure against unauthorized removal.

5. The cargo box as defined in claim 2 wherein, said panel means is a standard 4×8 foot building panel having a predetermined thickness substantially equal to the height of said riser portions such that the panel upper surface is substantially coplanar with the upper thread surface of said wheel housings.

6. The cargo box as defined in claim 1 wherein said panel means rearward transverse edge extends a predetermined distance beyond the terminus of the cargo area sidewalls such that said panel means transverse edge is received in a tailgate channel formed integral with the tailgate inner face panel.

* * * * *